(12) United States Patent
Luedtke

(10) Patent No.: US 7,797,175 B2
(45) Date of Patent: Sep. 14, 2010

(54) FINANCIAL ARRANGEMENT TO SUPPORT IMPLEMENTATION OF A RETIREMENT MEDICAL PROGRAM OR TO PROTECT A USERS FUTURE MEDICAL NEEDS

(76) Inventor: Timothy J. Luedtke, 2055 St. Andrews Dr., Berwyn, PA (US) 19312

( * ) Notice: Subject to any disclaimer, the term of this patent is extended or adjusted under 35 U.S.C. 154(b) by 295 days.

(21) Appl. No.: 11/969,377

(22) Filed: Jan. 4, 2008

(65) Prior Publication Data

US 2008/0103840 A1    May 1, 2008

Related U.S. Application Data

(63) Continuation-in-part of application No. 10/359,348, filed on Feb. 5, 2003, now Pat. No. 7,739,131.

(60) Provisional application No. 60/884,228, filed on Jan. 10, 2007.

(51) Int. Cl.
*G06Q 40/00* (2006.01)
(52) U.S. Cl. ............................................. 705/4
(58) Field of Classification Search .............. 705/4, 705/35
See application file for complete search history.

(56) References Cited

U.S. PATENT DOCUMENTS 5,590,037 A * 12/1996 Ryan et al. ................. 705/4
7,305,347 B1   12/2007 Joao
7,398,241 B2   7/2008 Fay et al.
2004/0039608 A1 * 2/2004 Mazur et al. ............... 705/4

OTHER PUBLICATIONS

Coleman, Dennis. "Planning Opportunities for Tax Effective Funding of Post-retirement Medical Benefits With a Profit Sharing Plan." 21 Tax Management Compensation Planning Journal No. 11 (1993), pp. 276-281.
Harris, Mary S. "Tax Free Distributions of Plan Benefits Paid on Account of Disability." 20 The Tax Adviser 1 (Jan. 1989), p. 18.
Office Action-Final Rejection for U.S. Appl. No. 10/359,348, mailed on Nov. 12, 2009. pp. 1-40.
Amendment After Final for U.S. Appl. No. 10/359,348, filed Jan. 12, 2010. pp. 1-21.
Notice of Allowance for U.S. Appl. No. 10/359,348, mailed on Mar. 9, 2010. pp. 1-33.

(Continued)

*Primary Examiner*—Hani Kazimi

(57) ABSTRACT

A method for providing a financial product that permits monies dedicated to a medical sub-account within a Dual-Purpose Profit Sharing plan (DPPSP) to maintain compliance with relevant IRS Tax Code provisions. The method comprising the steps of: establishing a document (MEDVAN) with provisions that maintain compliance with relevant IRS Tax Code provisions; add a provision to the document that assures all employer contributions made on behalf of the employee to the employee benefit plan are fully non-forfeitable; add a provision to the document that assures that all benefit payments to the primary and listed beneficiaries are exclusively for medical care; issue the MEDVAN to an employee benefit plan in exchange for a premium; and process payment requests from the MEDVAN based upon the medical needs of at least one employee listed as a beneficiary.

20 Claims, 7 Drawing Sheets

OTHER PUBLICATIONS

Supplemental Amendment and Response for U.S. Appl. No. 10/359,348, filed Jul. 24, 2009. pp. 1-14.
Amendment and Response for U.S. Appl. No. 10/359,348, filed Jul. 21, 2009. pp. 1-20.
Requirement for Restriction/Election for U.S. Appl. No. 10/359,348, mailed on Jun. 13, 2008. pp. 1-6.
Response to Restriction Requirement for U.S. Appl. No. 10/359,348, filed Oct. 10, 2008. pp. 1-7.
Office Action for U.S. Appl. No. 10/359,348, mailed on Jan. 22, 2009. pp. 1-22.
"Employee Benefits-Cafeteria Plans", Internal Revenue Service, Department of the Treasury, pp. 1-124.

* cited by examiner

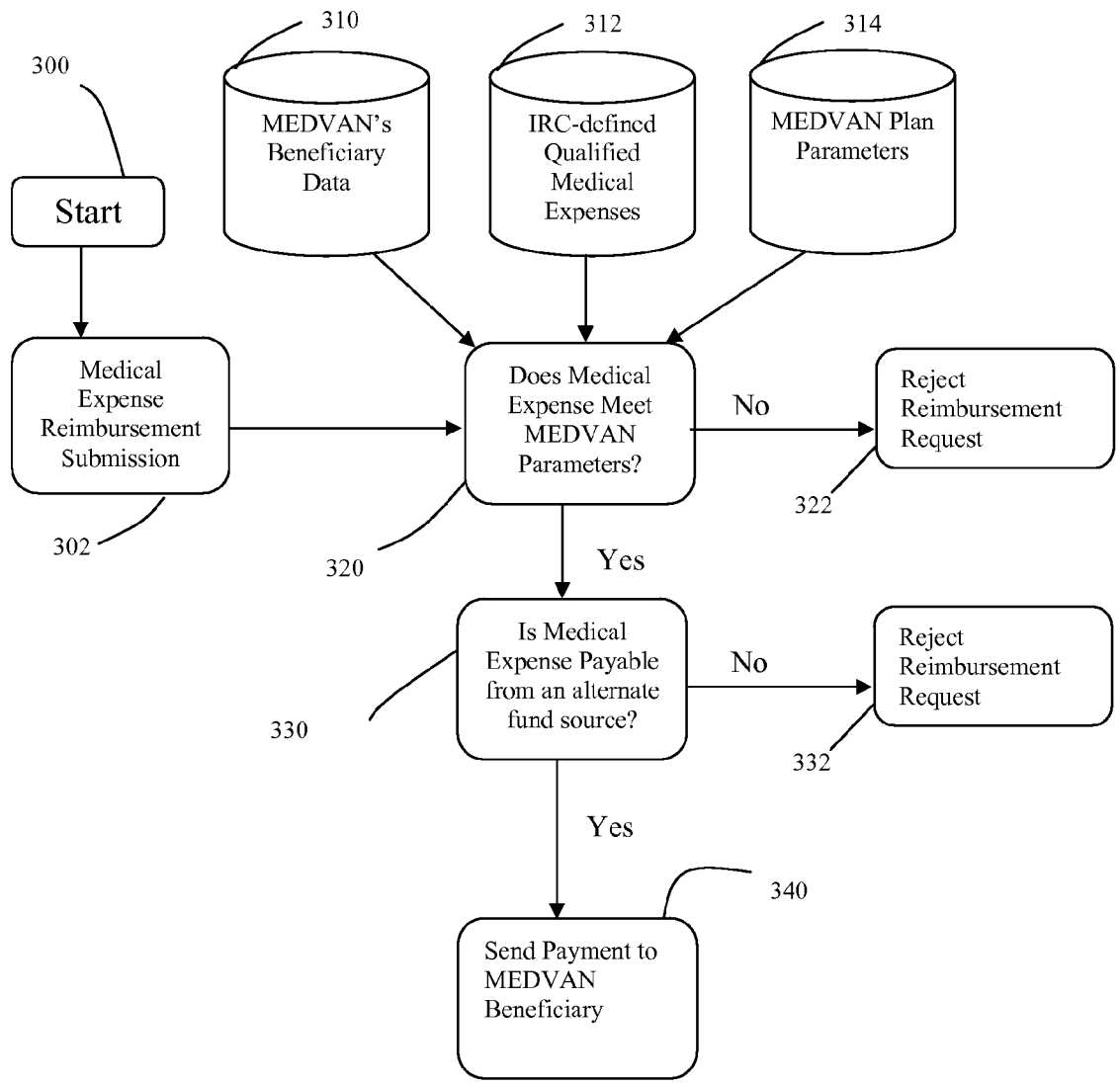

FINANCIAL ARRANGEMENT TO SUPPORT IMPLEMENTATION OF A RETIREMENT MEDICAL PROGRAM OR TO PROTECT A USERS FUTURE MEDICAL NEEDS

CROSS-REFERENCE TO RELATED APPLICATION

This application is a continuation in part of U.S. patent application Ser. No. 10/359,348 filed Feb. 5, 2003 and further claims the benefit of U.S. Provisional Patent Application Ser. No. 60/884,228 filed Jan. 10, 2007. The disclosures of each of the foregoing applications are hereby incorporated herein by reference.

FIELD OF THE INVENTION

This invention relates generally to health benefit plans. More specifically, the present invention relates to a medical variable annuity product. The product makes periodic payments to reimburse medical expenses or pay premiums for a medical insurance policy.

BACKGROUND OF THE INVENTION

In establishing a combined health reimbursement arrangement (HRA) and a dual-purpose profit sharing plan that fully utilizes the tax benefits available under the U.S. tax laws, two key requirements needed to establish such a plan are that monies dedicated to a medical sub-account must be both:
  a) fully non-forfeitable to the plan participant, and
  b) exclusively used for reimbursing medical expenses (as defined under Section 213 of the U.S. Tax Code) of the plan participant, their spouse, and their dependents (Section 152 of the U.S. Tax Code).

To date there have been numerous IRS Revenue Rulings that reiterate these two requirements:

Non-Forfeitability—Revenue Ruling 2005-55 found that a profit sharing plan that provides medical reimbursement expenses to each participant does not meet the provisions of Section 411 of the U.S. Tax Code on non-forfeitability and meeting one of the minimum vesting schedules.

Exclusive Use—Revenue Ruling 2005-24 found that an HRA that provides for payment of unused reimbursement amounts to plan participants in either cash or other non-medical benefits causes all payments made from the arrangements during the year to any person, including amounts paid to reimburse medical expenses, includable in gross income.

Exclusive Use—Revenue Ruling 2006-36 held that amounts paid as medical benefits to designated beneficiaries (other than the employee's spouse or dependents) are not excludable from employee's gross income. Any amounts so paid to a designated beneficiary causes all payments made from the HRA during the year to any person, including amounts paid to reimburse medical expenses, to be includable in gross income.

As a result of these two rulings it is important that a plan sponsor that is providing medical reimbursements to a plan participant through a dual-purpose plan to vest the employee in the plan contributions as required under Section 411 and to retain the certainty that any funds set aside will be used exclusively for Section 213 medical purposes.

There are no individual or group insurance products in the market today that a plan sponsor can purchase that guarantees them that both of these provisions (non-forfeitable and exclusive use) are met. Products in the market today do not offer either:
  1) an annuity that makes payments exclusively for the payment of medical reimbursements, expenses, or premiums, or
  2) a medical policy that extends for the life of the covered individual(s) and does not have future premiums that are subject to adjustment in the future—most policies today are guaranteed renewable and have monthly or annual premiums that are subject to change based upon the insurance pool's performance Additionally, existing insurance regulations and valuation standards do not contemplate such a product as health insurance regulations presume that offered policies will be limited to no more than a one year term and annuity standards assume payments are made for cash without limitation for demonstrated need.

SUMMARY OF THE INVENTION

In view of the shortcomings of the prior art, the present invention is a financial product that a plan sponsor may purchase that assures the plan sponsor that:
  a) any funds contributed to a medical subaccount are used exclusively for medical purposes, and
  b) the plan participant will vest in the accrued benefit (as defined under Section 411 under the medical subaccount)

The present invention is a specially constructed deferred variable annuity or medical insurance policy (MEDVAN— the invention) offered by a financial institution (a financial institution includes, yet is not limited to any of an insurance company, bank, mutual fund, trust company, savings and loan, credit union), a corporation, a trust, or an individual. MEDVAN's future payments are limited to reimbursing medical expenses and/or medical insurance premiums, up to a specified annual limit for the life of the individual plan participant and their spouse. Additionally, benefits may be extended to the plan participant's dependents while they are dependents.

Possible applications of this invention and the Navigator Plan™ would be for retiree health care, prescription drug needs, medical claims under workers' compensation, prefunding active employees' health care needs, funding Part B Medicare premiums, etc.

Key features of the MEDVAN product include:
  a) benefit period (or periods)—a benefit period is a designated time period (may be as short as one day or as long as the period from the MEDVAN issue date to the date on which the last of the primary beneficiary and the last of the listed beneficiaries dies) for when a benefit period limit exists.
  b) benefit period limit—the maximum medical care amount (defined by Section 213) that will be reimbursed or paid on behalf of the primary and/or listed beneficiaries for medical care amounts incurred within the open benefit period (such benefit may be any amount—as low as $0.01 or any higher amount and may vary by benefit period).
  c) assessment period (or periods)—an assessment period is a designated time period (may be as short as one day or as long as the period from the MEDVAN issue date to the date on which the last of the primary beneficiary and the last of the listed beneficiaries dies) for when calculations are made to determine the amount payable to the residual beneficiary—such period may cover one or more benefit periods.
d) benefit periods are either open or closed (open periods are periods for which expense reimbursement requests are accepted and may be paid—closed periods are periods for which expense reimbursement requests are rejected and not paid regardless whether such request would otherwise be eligible for reimbursement)
e) benefit period notification date—date on which notification must be made to primary beneficiary, or their agent, that a benefit period is (or periods are) closing
f) assessment period close date (last day of each assessment period)
g) assessment period closure pay date (date on which a payment is made to any residual beneficiary)
h) adjustment feature may be included that adjusts the benefit period limit based upon the performance of a pool of MEDVAN policies though such adjustment may not decrease the benefit below the guaranteed benefit limit
i) lifetime aggregate benefit—the lifetime aggregate benefit is the maximum amount payable for all benefit periods combined covering the entire MEDVAN coverage period (such aggregate benefit may be any amount greater than 500% of the contributed premiums).
j) deferral period—period before first benefit period begins (such deferral period may be as short as 0 days or as long as the retirement date of the employee); benefit periods must begin by the plan participant's retirement date
k) primary and listed beneficiaries or otherwise known as covered individual(s) (includes the plan sponsor's employee, as the primary beneficiary, and any or all of the following, as listed beneficiaries: the employee's spouse, divorced spouse, and/or dependents—though conceived to be initially positioned for use with an employer's benefit plan offering, MEDVAN may also be purchased by an individual or a family unit for their personal benefit).
l) residual beneficiary (irrevocable)—this is the person or entity to which any residual balance (remainder) associated with a closed assessment period (or periods) is paid on an assessment period closure pay date (the invention is conceived to be initially positioned for the residual beneficiary to be an employer, though may also be a union, non-employing corporation, charity, or individual)—if issued by a financial institution, there may not be a designated residual beneficiary, no assessment periods, and any residual balance is retained by the financial institution.
m) Payments (other than any residual beneficiary payments) may only be made to reimburse the primary beneficiary for medical expenses (Section 213 eligible) and/or medical insurance premiums that have not been otherwise reimbursed through insurance, other qualified benefit plans, or other third-party payments of the primary or listed beneficiaries.
n) early reimbursement payments—payments that reimburse the covered individual during the deferral period for medical expenses (Section 213 eligible) and/or medical insurance premiums that have not been otherwise reimbursed through insurance, other qualified benefit plans, or other third-party payments
o) early reimbursement deductible that must be met from cash payments paid by the covered individuals and not covered by any other insurance or third-party payments—such early reimbursement deductible must be met before any early reimbursement payments may be made (such early reimbursement deductible may be any amount—as low as $0.01 or any higher amount)
p) benefits terminate to all covered individuals once the last covered individual dies ending the MEDVAN's coverage period (for any expenses or premiums that are incurred prior to the covered individual's death are payable under the MEDVAN)
q) does not have a surrender provision that makes payments in cash or other non-qualified benefit to or on behalf of any of the primary or listed beneficiaries that are unrelated to medical care
r) marriage/dependent change provision that allows the spouse and/or dependent to be added to the MEDVAN as a listed beneficiary with a change to the benefit period limit and lifetime aggregate benefit
s) ownership change provision that transfers the MEDVAN ownership to the plan participant (employee) or their spouse/dependents on the earliest of their termination from employment or disability To administer a MEDVAN product the issuing company or individual will need to have:
a) a policy administration system
b) a claims administration system
c) premium schedule that relates a contribution amount (the premium) to an initial maximum annual benefit amount
d) early access schedule that relates an early benefit amount (early distributions) to a future annual benefit reduction amount. Such future annual benefit reduction amount reduces the maximum annual benefit amount otherwise payable of the MEDVAN product
e) method for adjusting the initial maximum annual benefit amount based upon the performance of a pool of MEDVAN products

SPECIFIED EMBODIMENTS

A first specified embodiment of this invention would be a MEDVAN that in exchange for a premium would be issued by an insurance company. Such MEDVAN would be purchased by a profit-sharing plan and owned by the plan. For this embodiment, the MEDVAN is issued on Jan. 1, 2008 on the covered life of a 35 year-old healthy male (John Doe who was born on Jan. 1, 1973). In exchange for a single premium of $1000 paid to the issuing insurance company the MEDVAN would have the following provisions (such provisions as illustrating one possible embodiment of this invention):
a) benefit period (or periods)—one year period beginning on January 1 each year after John Doe's retirement and ending on December 31 each year
b) benefit period limit—payable for medical care of $380.35
c) assessment period (or periods)—none, as no residual beneficiary
d) all benefit periods close twelve month's following John Doe's death, after which no expenses may be reimbursed.
e) benefit period notification date—six months following John Doe's death
f) assessment period close date—none, as no residual beneficiary
g) assessment period closure pay date—none, as no residual beneficiary
h) adjustment feature—none
i) lifetime aggregate benefit—$20,000.

j) deferral period—30 years or to age 65 (normal retirement age for the plan)
k) primary beneficiary (covered individual)—John Doe; there are no other listed beneficiaries
l) residual beneficiary (irrevocable)—none.
m) payments may only be made to reimburse John Doe's medical expenses (Section 213 eligible) and/or medical insurance premiums that have not been otherwise reimbursed through insurance, other qualified benefit plans, or other third-party payments.
n) early reimbursement payments—no early reimbursement payments permitted
o) early reimbursement deductible—Not Applicable
p) benefit termination—no payments will be made for medical expenses or premiums incurred after John Doe dies and there is no provision for any other benefits upon John Doe's death
q) does not have a surrender provision that makes payments in cash or other non-qualified benefit
r) marriage change provision that allows the plan and/or John Doe as owner to add his spouse as a covered individual with a change to the benefit period limit and lifetime aggregate benefit
s) ownership change provision—upon the earliest of John Doe's termination from employment or disability ownership for the MEDVAN will change to John Doe as owner.

A second specified embodiment of this invention would be a MEDVAN trust document that would be issued by a remainder trust. The trust would be owned by a profit-sharing plan established by Employer NBS. Monies put into the trust by the profit-sharing plan would be invested in a life insurance policy with the trust listed as the life insurance policy's beneficiary.

For this embodiment, the MEDVAN trust document outlines how the trust will work. The MEDVAN is issued on Jan. 1, 2008 on the covered life of a 35 year-old healthy male (John Doe), an employee of Employer NBS. In exchange for a single premium of $1000 paid to the trust and subsequently paid to an insurance company for a life insurance policy (the beneficiary of the life insurance policy is the MEDVAN trust). On John Doe's retirement the life insurance policy is converted to a life annuity either by execution of a cash value settlement option or through a life settlement sale of the policy in the secondary market and the subsequent purchase of a life annuity. In addition to these requirements, the MEDVAN trust document would have the following provisions (such provisions illustrating one possible embodiment of this invention):

a) benefit period (or periods)—one year period beginning on January 1 each year on or after John Doe's retirement and ending on December 31 each year
b) benefit period limit—payable for medical care of $380.35—reestablished each year after the first benefit period based upon performance of an insurance pool
c) assessment period (or periods)—from the date of the MEDVAN trust establishment to the date of John Doe's death.
d) all benefit periods close twelve month's following John Doe's death, after which no expenses may be reimbursed.
e) benefit period notification date—six months following John Doe's death
f) assessment period close date—the date of John Doe's death g) assessment period closure pay date—twelve (12) months following the last date of death of the primary beneficiary or other listed beneficiaries
h) adjustment feature—none
i) lifetime aggregate benefit—$20,000.
j) deferral period-30 years or to age 65 (normal retirement age for the plan)
k) primary beneficiary (covered individual)—John Doe; there are no other listed beneficiaries
l) residual beneficiary (irrevocable)—John Doe's employer that established the profit-sharing plan that owns the MEDVAN trust-residual beneficiary designation is irrevocable.
m) payments may only be made to reimburse John Doe's medical expenses (Section 213 eligible) and/or medical insurance premiums that have not been otherwise reimbursed through insurance, other qualified benefit plans, or other third-party payments.
n) early reimbursement payments—early reimbursement payments permitted—any payments made will reduce the benefit period limit and lifetime aggregate benefit payable at retirement
o) early reimbursement deductible—$5,000 per calendar year
p) benefit termination—no payments will be made for medical expenses or premiums incurred after John Doe dies and there is no provision for any other benefits upon John Doe's death
q) does not have a surrender provision that makes payments in cash or other non-qualified benefit
r) marriage change provision that allows the plan and/or John Doe as owner to add his spouse as a covered individual with a change to the benefit period limit and lifetime aggregate benefit
s) ownership change provision—upon the earliest of John Doe's termination from employment or disability ownership for the MEDVAN will change to John Doe as owner.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures:

FIG. 3 is a flowchart illustrating medical expense reimbursement processing for the exemplary method and system in an application of the present invention.

DETAILED DESCRIPTION

The exemplary descriptions outlined herein may be converted to program code by those knowledgeable in the art and executed on a computer or a network of computers to administer a MEDVAN product offering payment to a MEDVAN beneficiary for health benefits. The health benefits include any item defined as deductible under IRS Section 213. These health benefits currently include medical expenses—currently defined in IRS Publication 502 and are further described in Section 213 as "medical care" meaning:

a) for the diagnosis, cure, mitigation, treatment, or prevention of disease, or for the purpose of affecting any structure or function of the body, b) for transportation primarily for and essential to medical care referred to in subparagraph (A), c) for qualified long-term care services (as defined in section 7702B (c)), or d) for insurance (including amounts paid as premiums under part B of title XVIII of the Social Security Act, relating to supplementary medical insurance for the aged) covering medical care referred to in subparagraphs (A) and (B) or for any qualified long-term care insurance contract (as defined in section 7702B (b)).

To be compliant with IRC §401 and to receive benefits of Sections 104, 105, and 106, a medical sub-account within a dual purpose profit sharing plan must meet two key requirements. Monies dedicated to a medical sub-account must be both:

a) fully non-forfeitable to the plan participant, and b) exclusively used for reimbursing medical expenses (as defined under Section 213 of the U.S. Tax Code) of the plan participant, their spouse, and their dependents (Section 152 of the U.S. Tax Code).

The invention provides a method and system for providing a MEDVAN product that permits monies dedicated to such medical sub-account to meet these two requirements. Monies contributed to a medical sub-account are used to purchase a MEDVAN product either directly through an issuer (FIG. 1A) or indirectly through a MEDVAN trust (FIG. 2A).

Figure 1A:
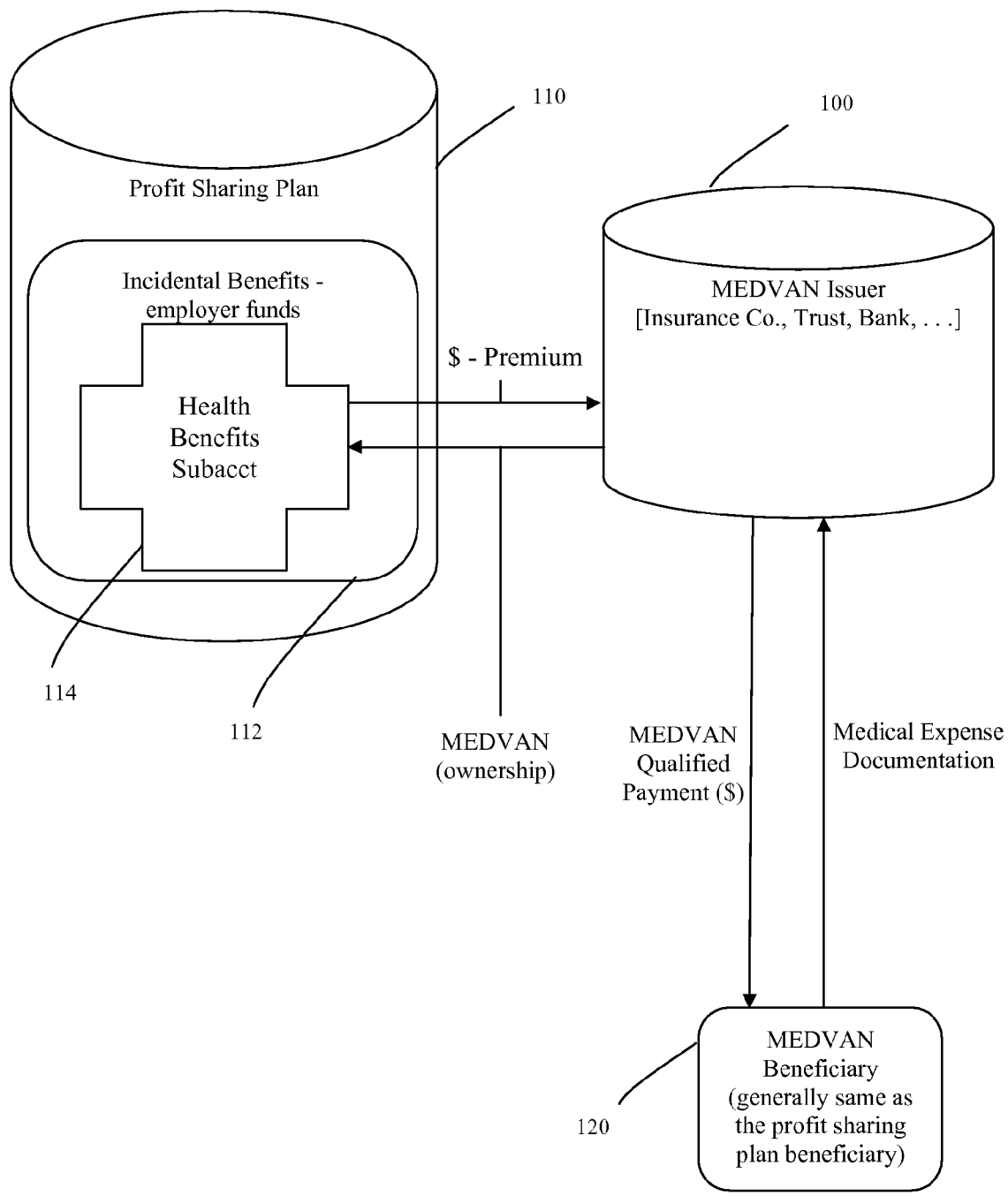
FIG. 1A is a flowchart that outlines the requirements to establish an insurance exemplary embodiment of the present invention.
Figure 2A:
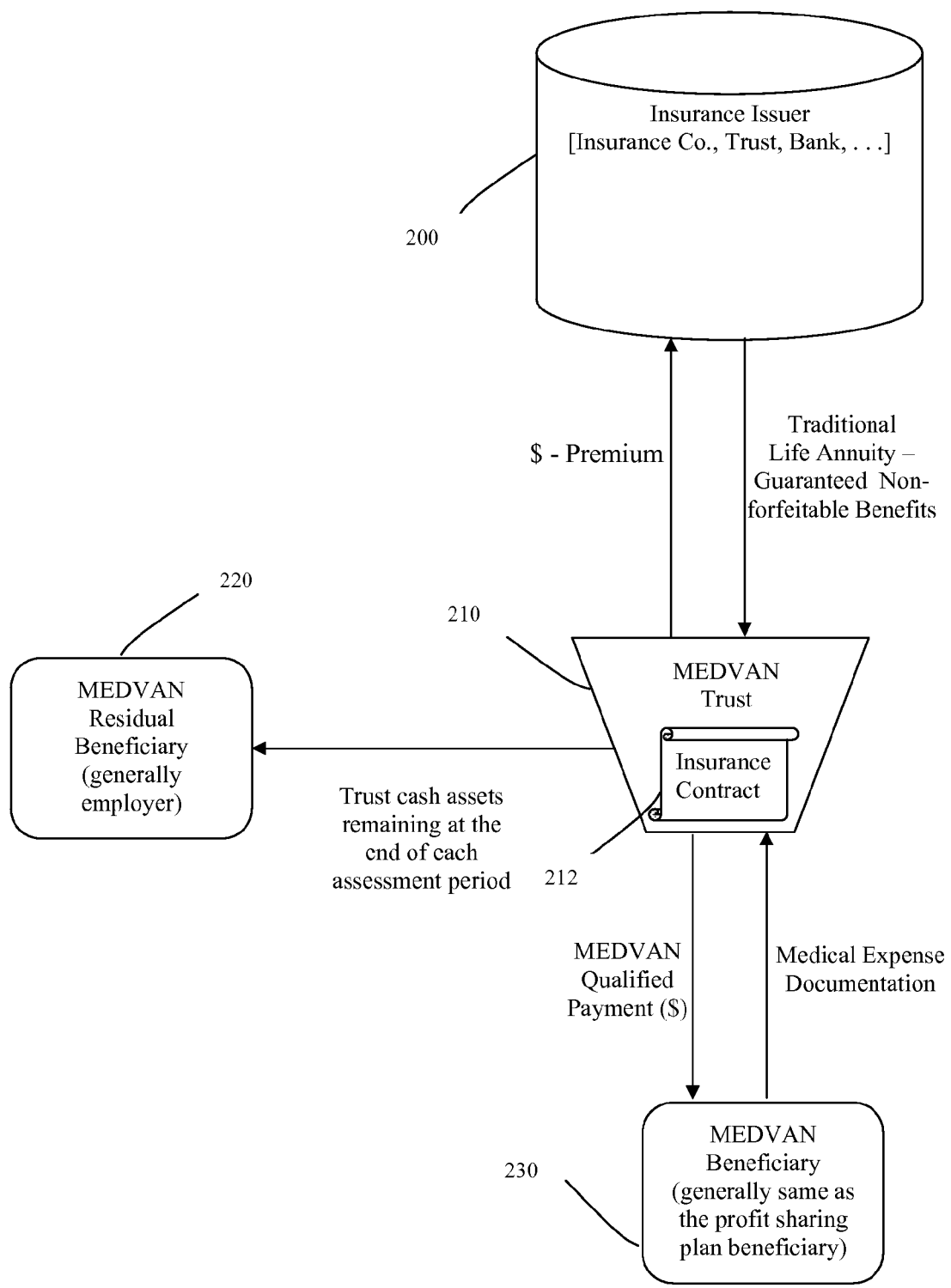
FIG. 2A is a flowchart that outlines the requirements to establish a trust-based exemplary embodiment of the present invention.

In FIG. 1A, a flowchart is shown illustrating the foundation supporting an exemplary embodiment of the invention where a MEDVAN product is sold directly by a MEDVAN issuer. FIG. 1A's exemplary embodiment is of an insured version of the MEDVAN product. A MEDVAN issuer, Step 100, may be any financial institution able to issue a financial product where payments are contingent upon the primary or listed beneficiaries' life status. The most likely issuer is an insurance or reinsurance company by may include other financial institutions. The MEDVAN issuer issues an annuity whose payments are only made to reimburse medical care expenses defined under Section 213 of the U.S. Tax Code.

Figure 1B:
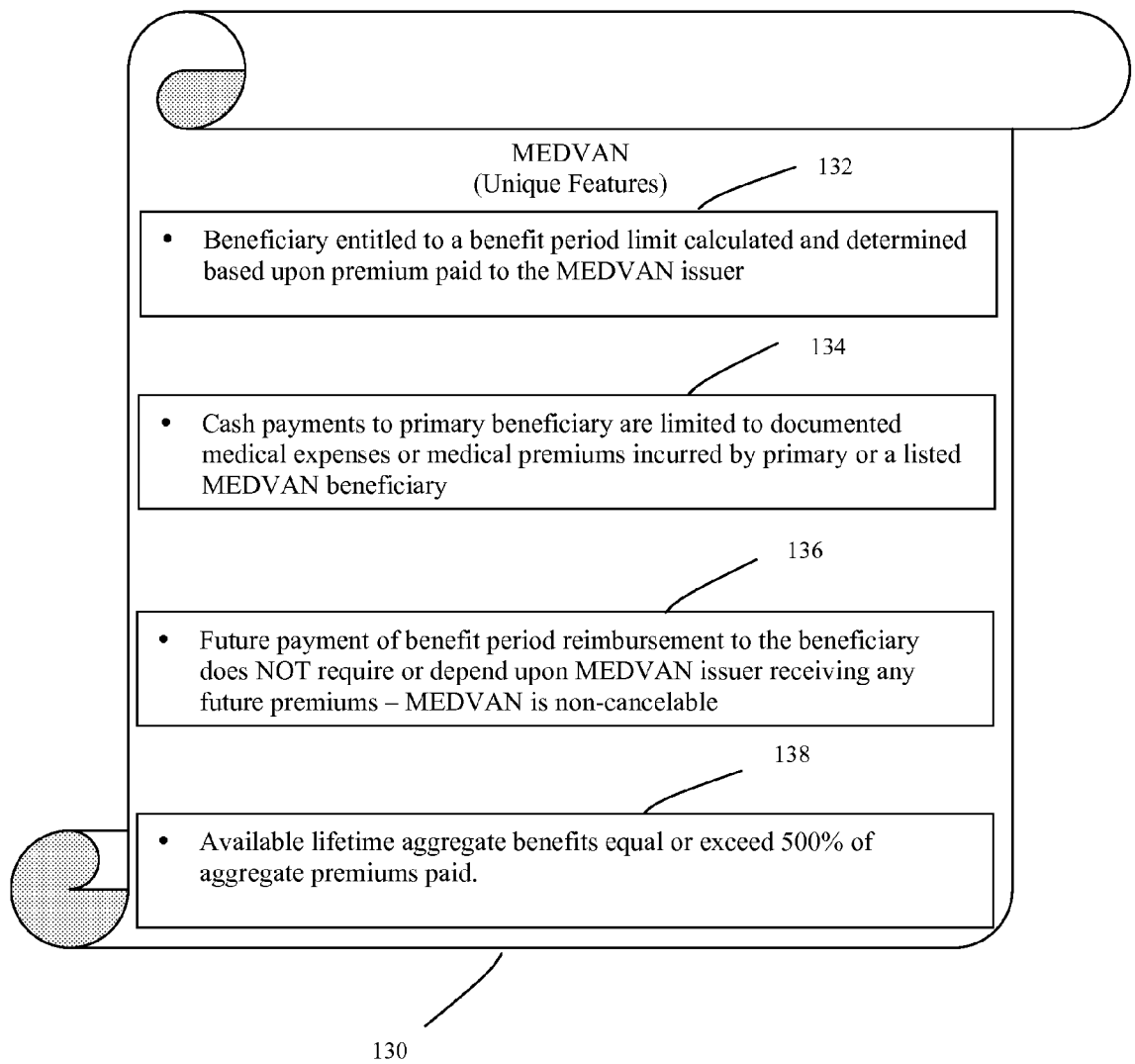
FIG. 1B shows document provisions to establish an insurance exemplary embodiment of the present invention.

FIG. 1B outlines the unique features of the MEDVAN product that are unavailable in the market today, Step 130. These features include:

a) a benefit period limit calculated and determined by the premium paid to the MEDVAN issuer, Step 132;

b) cash payments to primary beneficiary (generally the employee) are limited to documented medical expenses or medical premiums incurred by a listed MEDVAN beneficiary, Step 134 (listed beneficiaries are limited to the primary beneficiary, their spouse and dependents meeting the requirements of U.S. Tax Code Section 152);

c) policy is non-cancelable and benefits do not depend upon payment of any future premium, Step 136; and d) the lifetime aggregate benefit equals or exceeds 500% of the aggregate premiums paid to the MEDVAN issuer, Step 138.

Figure 1C:
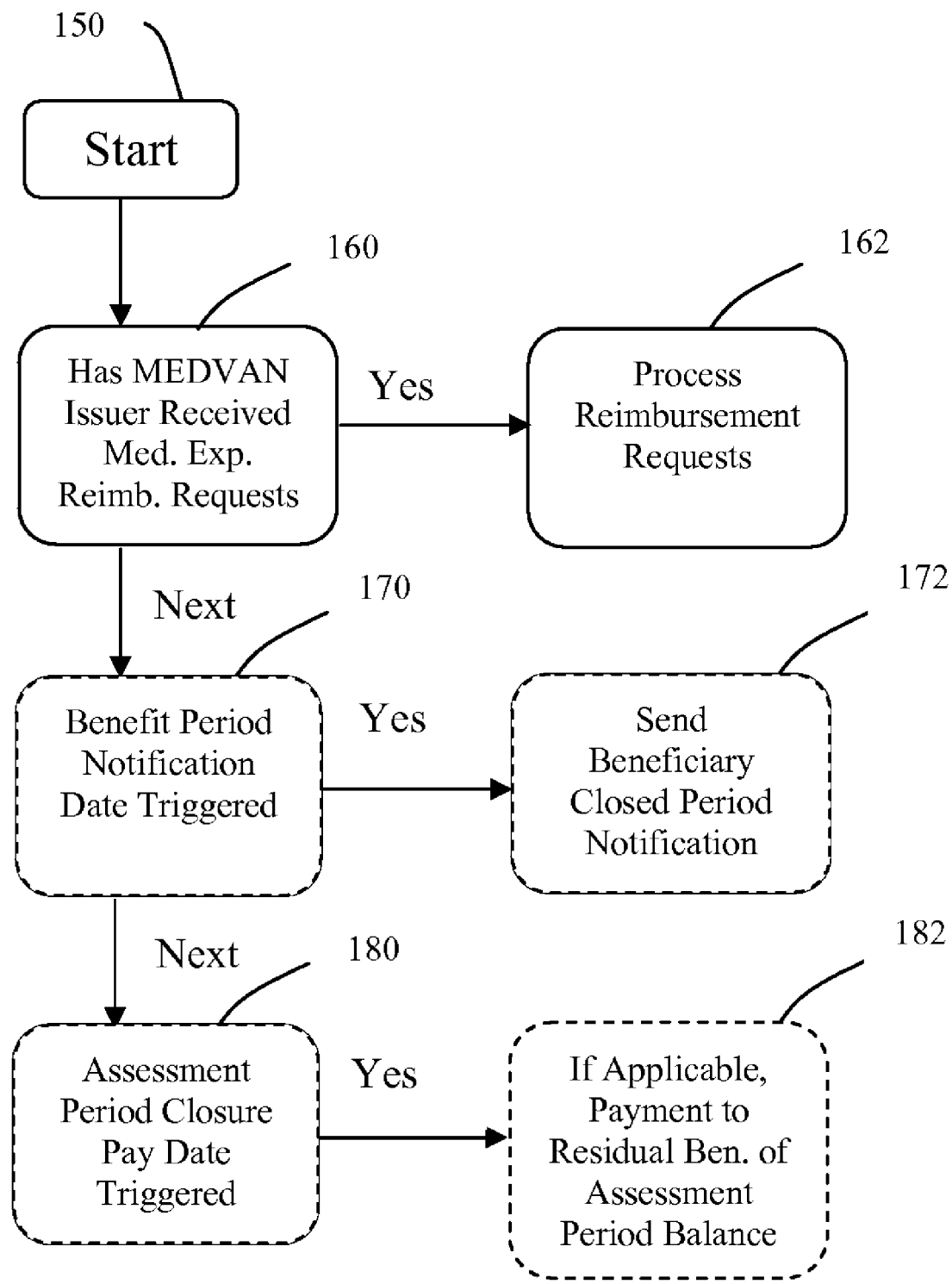
FIG. 1C is a flowchart that outlines the process a MEDVAN issuer completes to administer an insurance exemplary embodiment of the present invention.

Referring to FIG. 1C and FIG. 3, these flowcharts illustrate the methods a MEDVAN issuer would use to administer a MEDVAN product. Starting at Step 150 the MEDVAN issuer, using a computerized administration system, would perform the following actions each day. At Step 160, determine whether the issuer had received any medical expense reimbursement requests (which includes any premium payment for a health insurance policy meeting the requirements of Section 213). Each medical expense reimbursement request that the MEDVAN issuer receives will be processed using the steps outline in FIG. 3.

Per FIG. 3, at Step 300, the process is initiated. At Step 302, it is determined whether the primary beneficiary or their agent made a medical expense reimbursement submission. If a medical expense reimbursement submission is received by the MEDVAN issuer for an open benefit period, apply data from the MEDVAN beneficiary database (Step 310), apply data from the MEDVAN plan parameter database (Step 314), apply U.S. Tax Code Section 213 definitions of qualified medical care to the process of Step 320. If the reimbursement submission does not meet all of the MEDVAN parameter requirements at Step 320, then proceed to Step 322 and reject the reimbursement submission sending a rejection notice to the MEDVAN primary beneficiary. Such rejection notice may be made through a written notice, voicemail transmission, electronic e-mail transmission, or information source readily available to the primary beneficiary. If the reimbursement submission does meet the MEDVAN parameter requirements at Step 320, then proceed to Step 330. At Step 330, determine whether the medical expense (which includes any premium payment for a health insurance policy meeting the requirements of Section 213) is or has been reimbursed from any alternate fund source (these alternate fund sources could include but are not limited to other insurance, employer reimbursements, Medicare). If there is an alternate fund source that has or will reimburse the subject medical expense submitted for reimbursement, then proceed to Step 332 and reject the reimbursement submission sending a rejection notice to the MEDVAN primary beneficiary. Such rejection notice may be made through a written notice, voicemail transmission, electronic e-mail transmission, or information source readily available to the primary beneficiary. If there is not an alternate fund source that has or will reimburse the subject medical expense submitted for reimbursement, then proceed to Step 340 and prepare and send a MEDVAN payment to the MEDVAN primary beneficiary. Such payment may be made as a paper check, electronic funds transfer, or by any other means of transferring economic value to the primary beneficiary. Such payment may be paid either directly to the primary beneficiary or indirectly on behalf of the primary beneficiary to a party to which the primary beneficiary owes the medical expense being reimbursed.

Returning to FIG. 1C, at Step 170, if an benefit period notification date has triggered then proceed to Step 172—a notification date is triggered on the first business day occurring on or after the benefit period notification date listed in the MEDVAN policy document. At Step 172, the MEDVAN issuer will send a notification to the MEDVAN primary beneficiary, or if the primary beneficiary is deceased, to the MEDVAN listed beneficiary stating that an older open benefit period will be closing and that any outstanding medical expenses requiring reimbursement associated with such open assessment period should be submitted or forgo any such reimbursement.

At Step 180, if an assessment period closure pay date has triggered then proceed to Step 182—an assessment period closure pay date is triggered on the first business day occurring on or after the assessment period closure pay date listed in the MEDVAN policy document. At Step 182, the MEDVAN issuer will close the previously open assessment period. Also at Step 182, if the MEDVAN provides provision for payments to a residual beneficiary then the MEDVAN issuer will prepare and send a MEDVAN payment to the MEDVAN residual beneficiary designated in the MEDVAN document (in the exemplary embodiment the employer is designated as the MEDVAN residual beneficiary). The amount of the MEDVAN payment, such MEDVAN payment may be called an experience refund, will be for the liquidated cash value of the remaining assets (the residual balance) in the MEDVAN trust associated with the just closed benefit periods that reached the assessment period closure pay date triggering the payment. The remaining assets must be liquidated and converted to cash prior to payment. In no event will the residual beneficiary be designated such that the primary beneficiary, their spouse, or their dependents receive any economic value for the residual balance associated with any just closed assessment period. Such payment may be made as a paper check, electronic funds transfer, or by any other means of transferring economic value to the residual beneficiary.

In FIG. 2A, a flowchart is shown illustrating the foundation supporting an exemplary embodiment of the invention where a MEDVAN product is manufactured through the establishment of an individual trust (the MEDVAN trust) and the purchase of a life annuity or life insurance contract that is held in such trust. FIG. 2A's exemplary embodiment is of a non-insured version of the MEDVAN product. A MEDVAN trust, Step 210, issues an annuity whose payments are only made to reimburse medical care expenses defined under Section 213 of the U.S. Tax Code.

Figure 2B:
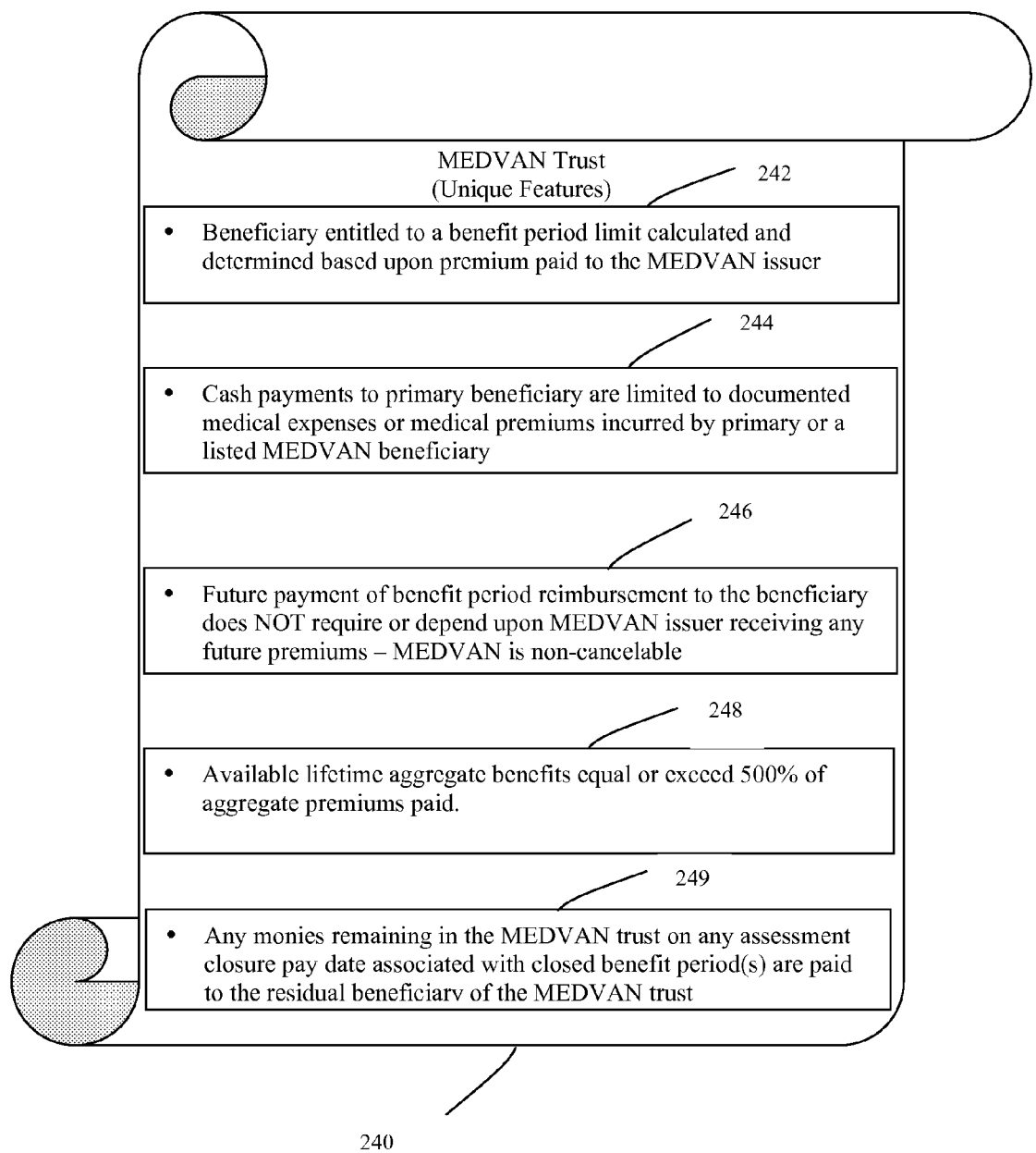
FIG. 2B shows the document provisions to establish an insurance exemplary embodiment of the present invention.

FIG. 2B outlines the unique features of the MEDVAN product that are unavailable in the market today, Step 240. These features include:

a) a benefit period limit calculated and determined by the premium paid to the MEDVAN issuer, Step 242;

b) cash payments to primary beneficiary (generally the employee) are limited to documented medical expenses or medical premiums incurred by a listed MEDVAN beneficiary, Step 244 (listed beneficiaries are limited to the primary beneficiary, their spouse and dependents meeting the requirements of U.S. Tax Code Section 152);

c) policy is non-cancelable and benefits do not depend upon payment of any future premium, Step 246;

d) the aggregate lifetime benefit equals or exceeds 500% of the aggregate premiums paid to the MEDVAN issuer, Step 248; and e) monies remaining in the MEDVAN trust on any assessment closure pay date associate with closing benefit period(s) are paid to the residual beneficiary of the MEDVAN trust, Step 249.

Figure 2C:
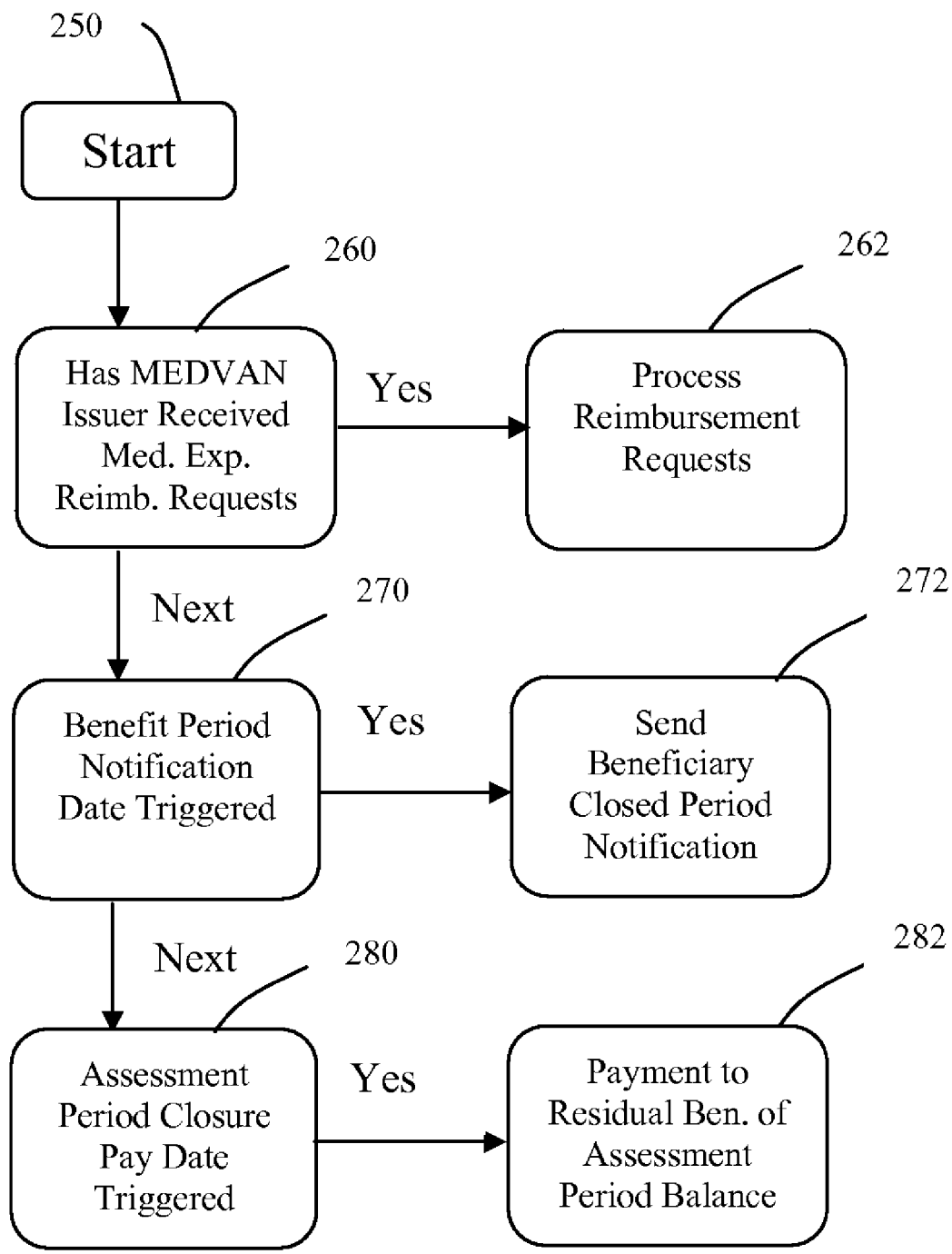
FIG. 2C is a flowchart that outlines the process a MEDVAN issuer completes to administer a trust-based exemplary embodiment of the present invention.

Referring to FIG. 2C and FIG. 3, these flowcharts illustrate the methods a MEDVAN trustee would use to administer a MEDVAN product through a MEDVAN trust. Starting at Step 250 the MEDVAN trustee, using a computerized administration system, would perform the following actions each day. At Step 260, determine whether the trust had received any medical expense reimbursement requests (which include any premium payment for a health insurance policy meeting the requirements of Section 213). Each medical expense reimbursement request that the MEDVAN trustee receives will be processed using the steps outline in FIG. 3.

Per FIG. 3, at Step 300, the process is initiated. At Step 302, it is determined whether the primary beneficiary or their agent made a medical expense reimbursement submission. If a medical expense reimbursement submission is received by the MEDVAN issuer for an open benefit period, apply data from the MEDVAN beneficiary database (Step 310), apply data from the MEDVAN plan parameter database (Step 314), apply U.S. Tax Code Section 213 definitions of qualified medical care to the process of Step 320. If the reimbursement submission does not meet all of the MEDVAN parameter requirements at Step 320, then proceed to Step 322 and reject the reimbursement submission sending a rejection notice to the MEDVAN primary beneficiary. Such rejection notice may be made through a written notice, voicemail transmission, electronic e-mail transmission, or information source readily available to the primary beneficiary. If the reimbursement submission does meet the MEDVAN parameter requirements at Step 320, then proceed to Step 330. At Step 330, determine whether the medical expense (which includes any premium payment for a health insurance policy meeting the requirements of Section 213) is or has been reimbursed from any alternate fund source (these alternate fund sources could include but are not limited to other insurance, employer reimbursements, Medicare). If there is an alternate fund source that has or will reimburse the subject medical expense submitted for reimbursement, then proceed to Step 332 and reject the reimbursement submission sending a rejection notice to the MEDVAN primary beneficiary. Such rejection notice may be made through a written notice, voicemail transmission, electronic e-mail transmission, or information source readily available to the primary beneficiary. If there is not an alternate fund source that has or will reimburse the subject medical expense submitted for reimbursement, then proceed to Step 340 and prepare and send a MEDVAN payment to the MEDVAN primary beneficiary. Such payment may be made as a paper check, electronic funds transfer, or by any other means of transferring economic value to the primary beneficiary. Such payment may be paid either directly to the primary beneficiary or indirectly on behalf of the primary beneficiary to a party to which the primary beneficiary owes the medical expense being reimbursed.

Returning to FIG. 2C, at Step 270, if a benefit period notification date has triggered then proceed to Step 272—a notification date is triggered on the first business day occurring on or after the benefit period notification date listed in the MEDVAN trust document. At Step 272, the MEDVAN issuer will send a notification to the MEDVAN primary beneficiary, or if the primary beneficiary is deceased, to the MEDVAN listed beneficiary stating that an older open benefit period will be closing and that any outstanding medical expenses requiring reimbursement associated with such open assessment period should be submitted or forgo any such reimbursement.

At Step 280, if an assessment period closure pay date has triggered then proceed to Step 282—an assessment period closure pay date is triggered on the first business day occurring on or after the assessment period closure pay date listed in the MEDVAN trust document. At Step 282, the MEDVAN trustee will close the previously open assessment period and prepare and send a MEDVAN payment to the MEDVAN residual beneficiary designated in the trust document (in the exemplary embodiment the employer is designated as the MEDVAN residual beneficiary). The amount of the MED- VAN payment, such MEDVAN payment may be called an experience refund, will be for the liquidated cash value of the remaining assets (the residual balance) in the MEDVAN trust associated with the just closed benefit periods that reached the assessment period closure pay date triggering the payment. The remaining assets must be liquidated and converted to cash prior to payment. In no event will the residual beneficiary be designated such that the primary beneficiary, their spouse, or their dependents receive any economic value for the residual balance associated with any just closed assessment period. Such payment may be made as a paper check, electronic funds transfer, or by any other means of transferring economic value to the residual beneficiary.

Thus, according to the present invention (methods and system) there is a more efficient method and system for creating a tax-advantaged health sub-account within a dual purpose profit sharing plan providing employee benefits to active and retired employees, their spouse, and dependents. The exemplary methods permit the employer to accumulate monies dedicated to a medical sub-account that are both:

a) fully non-forfeitable to the plan participant, and b) exclusively used for reimbursing medical expenses (as defined under Section 213 of the U.S. Tax Code) of the plan participant, their spouse, and their dependents (Section 152 of the U.S. Tax Code).

Although the invention has been described with reference to exemplary embodiments, it is not limited thereto. Rather, the appended claims should be construed to include other variants and embodiments of the invention, which may be made by those skilled in the art without departing from the true spirit and scope of the present invention.

What is claimed is:

1. A method for using a computer system, the method comprising the steps of:

executing program code on a computer system in carrying out the steps of:

accessing a database for beneficiary data for at least one beneficiary, for annuity data for at least one life annuity, and for at least one contribution which becomes a premium to be exchanged for a financial arrangement that provides only for medical purposes for a coverage period ending at a time on or after the last death of said at least one beneficiary for at least one benefit period;

combining the premium, the beneficiary data, and the life annuity data in determining a maximum medical care amount for each said benefit period;

aggregating the maximum medical care amount for each said benefit period in determining an amount payable for all said benefit periods;

calculating a minimum lifetime aggregate medical care reimbursement benefit limit equal to a factor that is at least 500% multiplied by the premium received for the arrangement;

calculating a lifetime aggregate benefit as greatest of the minimum lifetime aggregate medical care reimbursement benefit limit, a lifetime aggregate medical care reimbursement benefit limit, and the amount payable for all said benefit periods;

calculating a benefit period limit for each said benefit period, the benefit period limit equal to the maximum medical care amount for the corresponding benefit period multiplied by a factor that is the greater of a value of one and a ratio of the minimum lifetime aggregate medical care reimbursement benefit limit to the amount payable for all said benefit periods; and creating a health plan document including the lifetime aggregate benefit and the benefit period limit for each said benefit period.

2. The method according to claim 1, wherein the step of creating the health plan document is carried out such that the health plan document includes a statement that beneficiary receipt of future medical care benefits are non-forfeitable and do not depend upon the payment of future premiums.

3. The method according to claim 1, wherein the step of creating the health plan document is carried out such that the health plan document includes a statement that future benefit payments will only be made for reimbursement of medical expenses that have not otherwise been reimbursed.

4. The method according to claim 1, wherein the step of creating the health plan document is carried out such that the health plan document includes a statement that receipt of future medical care benefits may be deferred until the occurrence of a specified retirement event.

5. The method according to claim 1, wherein the step of creating the health plan document is carried out at least one of i) an insurance company, ii) a financial institution, iii) an individual account trustee and iv) an unrelated third party administrator.

6. The method according to claim 1, wherein the issuer step of creating the health plan document is carried out such that the health plan document includes a statement that the health plan document is for a trust.

7. The method according to claim 6, wherein the step of creating the health plan document is carried out with the trust corresponding to a remainder trust.

8. The method according to claim 6, wherein the step of creating the health plan document is carried out with the trust corresponding to a trust holding a life annuity.

9. The method according to claim 6, wherein the step of creating the health plan document is carried out with the trust corresponding to a trust holding a life insurance policy.

10. The method according to claim 6, wherein the step of creating the health plan document is carried out such that the health plan document includes a statement that monies in the trust remaining after reimbursement of all outstanding beneficiary medical care requests are paid to a residual beneficiary.

11. The method according to claim 10, wherein the step of creating the health plan document is carried out such that the residual beneficiary corresponds to an employer.

12. The method according to claim 1, wherein the lifetime aggregate benefit is unlimited.

13. The method according to claim 3, wherein the medical expenses include qualified health insurance premiums.

14. A computer apparatus including:

a computer-to-computer networked apparatus executing program code to exchange information from a database and between computers to create a health plan document; one of the computers attached to the network:

accessing a database for beneficiary data for at least one beneficiary, for annuity data for at least one life annuity, and for at least one contribution which becomes a premium to be exchanged for a financial arrangement that provides only for medical purposes for a coverage period ending at a time on or after the last death of said at least one beneficiary for at least one benefit period;

combining the premium, the beneficiary data, and the life annuity data in determining a maximum medical care amount for each said benefit period;

aggregating the maximum medical care amount for each said benefit period in determining an amount payable for all said benefit periods;

calculating a minimum lifetime aggregate medical care reimbursement benefit limit equal to a factor that is at least 500% multiplied by the premium received for the arrangement;

calculating a lifetime aggregate benefit as the greatest of the minimum lifetime aggregate medical care reimbursement benefit limit, a lifetime aggregate medical care reimbursement benefit limit, and the amount payable for all said benefit periods;

calculating a benefit period limit for each said benefit period, the benefit period limit equal to the maximum medical care amount for the corresponding benefit period multiplied by a factor that is the greater of a value of one and a ratio of the minimum lifetime aggregate medical care reimbursement benefit limit to the amount payable for all said benefit periods; and creating the health plan document including the lifetime aggregate benefit and the benefit period limit for each said benefit period.

15. The apparatus of claim 14, whereby the health plan document includes a statement that beneficiary receipt of future medical care benefits are non-forfeitable.

16. The apparatus of claim 14, whereby the the health plan document includes a statement that receipt of future medical care benefits do not depend upon the payment of future premiums.

17. The apparatus of claim 14, whereby the the health plan document includes a statement that future benefit payments will only be made for reimbursement of medical expenses that have not otherwise been reimbursed.

18. The apparatus of claim 14, whereby the the health plan document that includes a statement that receipt of future medical care benefits may be deferred until the occurrence of a specified retirement event.

19. The apparatus of claim 14, whereby the creating the health plan document includes a statement that the document is for a trust.

20. The apparatus of claim 14, whereby the health plan document includes a statement that the document is an insurance contract.

\* \* \* \* \*